(12) United States Patent (10) Patent No.: US 6,611,284 B2
Lourie et al. (45) Date of Patent: Aug. 26, 2003

(54) TEMPORARY CONVERSION OF A VIDEO CONFERENCING CAMERA INTO A DIGITAL CAMERA

(75) Inventors: David S. Lourie, Portland, OR (US); Fred J. Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/054,860

(22) Filed: Apr. 3, 1998

(65) Prior Publication Data

US 2002/0089600 A1 Jul. 11, 2002

(51) Int. Cl.[7] .......................... H04N 5/225; H04N 11/00
(52) U.S. Cl. ..................... 348/207.1; 348/373; 348/552
(58) Field of Search ................. 348/207, 15, 341, 348/373, 376, 552, 207.99, 207.1, 14.08

(56) References Cited

U.S. PATENT DOCUMENTS

| | | | | |
|---|---|---|---|---|
| 5,475,441 A | * | 12/1995 | Parulski et al. | ............. 348/207 |
| 5,625,410 A | * | 4/1997 | Washino et al. | ............. 348/552 |
| 5,708,853 A | * | 1/1998 | Sanemitsu | ................... 348/376 |
| 5,754,227 A | * | 5/1998 | Fukuoka | ..................... 348/373 |
| 5,867,218 A | * | 2/1999 | Matsuzaki et al. | .......... 348/373 |
| 5,872,922 A | * | 2/1999 | Hogan et al. | .................. 348/15 |
| 5,917,545 A | * | 6/1999 | Kowno et al. | ............... 348/552 |

\* cited by examiner

*Primary Examiner*—Wendy R. Garber
*Assistant Examiner*—Luong Nguyen
(74) *Attorney, Agent, or Firm*—Blakely, Sokoloff, Taylor & Zafman LLP

(57) ABSTRACT

A camera converter is disclosed. The camera converter includes a number electronic components that operate to selectively generate digital still images responsive to user controls using video signals received from a removably attached video conferencing camera, which includes a lens and a first communication interface. The camera further includes a housing that operates to enclose the electronic components, and to removably accept the video conferencing camera. The housing in particular includes a view finder that is optically coordinated with the lens of the video conferencing camera, a second communication interface that mates with the first communication interface of the video conferencing camera, and user input mechanisms for providing said user controls.

14 Claims, 6 Drawing Sheets

TEMPORARY CONVERSION OF A VIDEO CONFERENCING CAMERA INTO A DIGITAL CAMERA

BACKGROUND OF THE INVENTION

1. Field of the Invention

The present invention relates to the field of video conferencing and the field of digital cameras. In particular, the present invention relates to the temporal conversion of a video conferencing camera into a digital camera.

2. Background Information

As advances in microprocessor and other related technologies continue to improve the price/performance of various electronic components, video conferencing, including video conferencing conducted using personal computers (PC), has become increasingly popular in recent years. Numerous PC based video conferencing products designed to take advantage of the increased processing power of today's PCs are now available in the market place. An example of such video conferencing products is the ProShare™ Video Conferencing product, available from Intel Corp., of Santa Clara, Calif., the assignee of the present invention. Typically, these PCs are equipped with video conferencing cameras that are physically connected or tethered to the main system units of the PCs, for capturing the local video images.

Most recently, numerous relatively inexpensive but yet functionally rich digital cameras have also become available in the market place. The digital cameras are being used by amateur photographers for day-to-day routine casual photography as well as by professional photographers including photo journalists and artists for serious journalistic and artistic works. Many digital cameras include interfaces that allow the digital cameras to be coupled to PCs, such that the digital photographs can be downloaded to the PCs for viewing and/or further processing.

None of the video conferencing cameras known in the art can be detachably employed as a digital camera. Similarly, none of the digital camera known in the art can function as a video conferencing camera. As a result, users interested in both video conferencing and digital photography are disadvantageously burdened with the cost of purchasing both cameras. Additionally, since the video conferencing camera requires its own video capture add-on card, while the digital camera requires its own I/O port, the user is disadvantageously burdened with providing more I/O resources to the PC than necessary.

Thus, a more efficient and cost effective approach to meeting the equipment needs of users interested in both video conferencing and digital photography is desired.

SUMMARY OF THE INVENTION

A camera converter is disclosed. The camera converter includes a number of electronic components that operate to selectively generate digital still images responsive to user controls using video signals received from a removably attached video conferencing camera, which includes a lens and a first communication interface. The camera further includes a housing that operates to enclose the electronic components, and to removably accept the video conferencing camera. The housing in particular includes a view finder that is optically coordinated with the lens of the video conferencing camera, a second communication interface that mates with the first communication interface of the video conferencing camera, and user input mechanisms for providing the user controls.

A camera kit is also disclosed. The camera kit includes the above described camera converter and video conferencing camera.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1A:
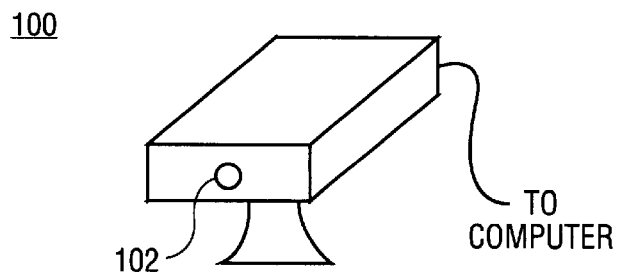
FIGS. 1a–1b are perspective and internal architectural views of one embodiment of a conventional video conferencing camera suitable for use to practice the present invention.
Figure 1B:
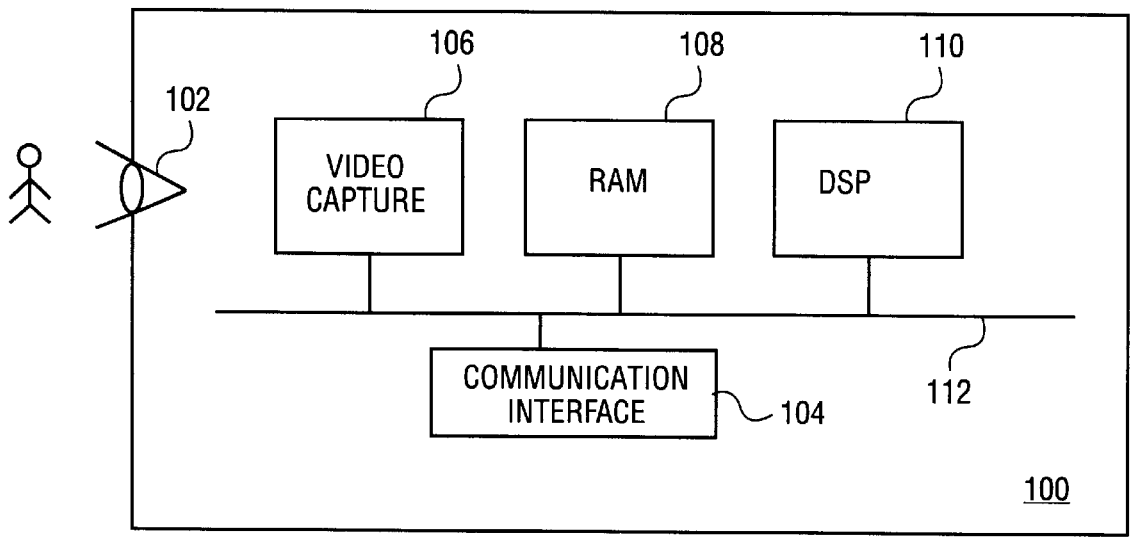

Referring now to FIGS. 1a–1b, wherein a perspective view and an internal architectural view of one embodiment of a conventional video conferencing camera suitable for use to practice the present invention are shown. For the illustrated embodiment, video conferencing camera 100 includes lens 102, communication interface 104, video capture 106, random access memory 108, digital signal processor 110, and bus 112 coupling elements 104–110 to each other. Together, these elements 102–112 cooperate to enable video conferencing camera 100 to be attached and used by a computer (not shown) to conduct a video conference for a user of the computer.

Each of these elements 102–112 performs its respective conventional function known in the art. That is, video capture 106 in cooperation with lens 102 captures and digitizes visual images, memory 108 provides temporary storage to the digitized video data, digital signal processor 110 generates video signals representative of the visual images, and provides them to the attached computer through communication interface 104, and so forth. Elements 102–112 are intended to represent a broad range of these elements known in the art. In fact, video conferencing camera 100 is intended to represent a broad range of video conferencing cameras known in the art.

Figure 2A:
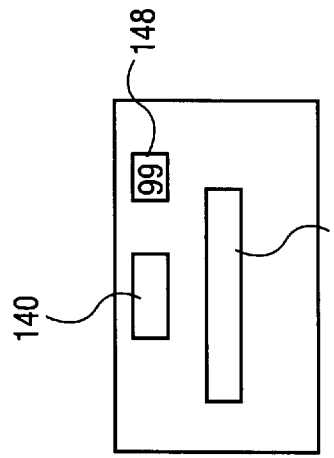
FIGS. 2a–2c are perspective, back and internal architectural views of one embodiment of a camera converter of the present invention.
Figure 2B:
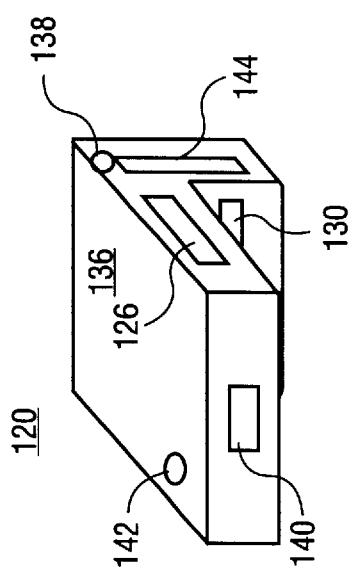
Figure 2C:
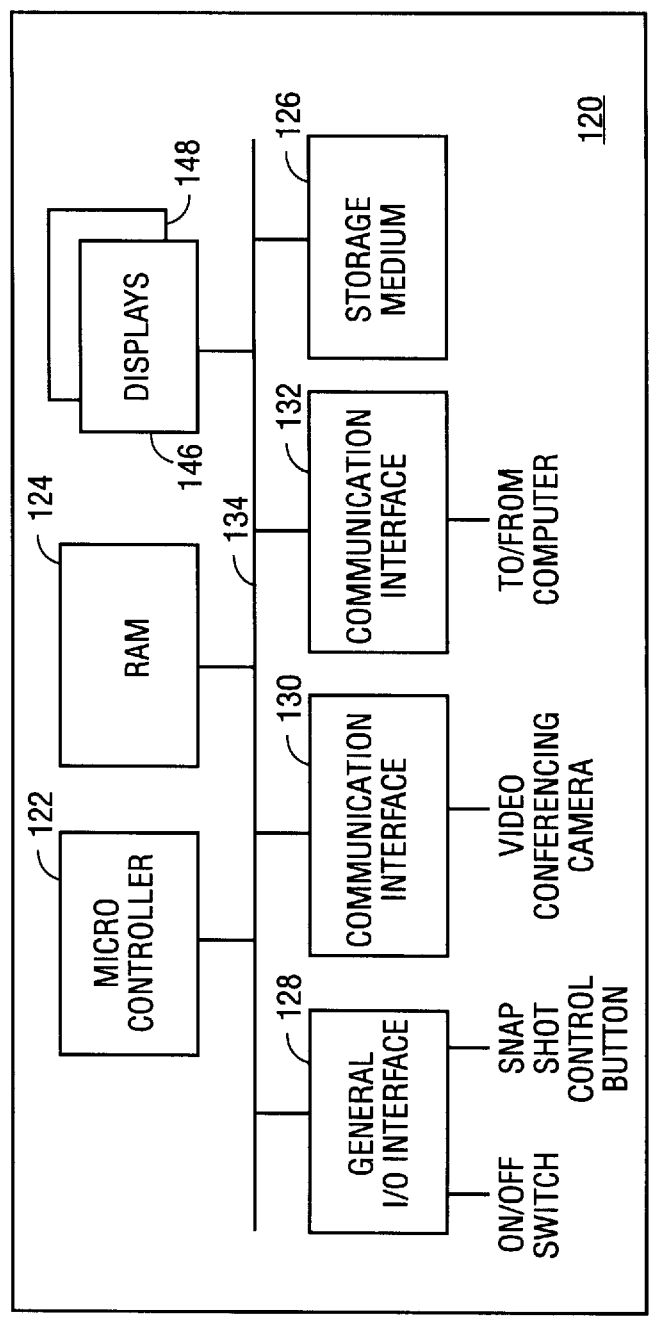

FIGS. 2a–2c illustrate a perspective view, a back view and an internal architectural view of one embodiment of the camera converter of the present invention. For the illustrated embodiment, camera converter 120 includes microcontroller 122, random access memory 124, removable non-volatile storage medium 126, general I/O interface 128, first and second communication interfaces 130 and 132, and bus 134 coupling elements 122–132 to each other. Camera converter 120 also includes housing 136 having disposed thereon on/off switch 138, viewfinder 140, snap shot control button 142, battery 144, first and second visual displays 146 and 148, and fastening features (not shown). Together, these elements cooperate to temporally convert video conferencing camera 100 of FIG. 1 into a digital camera.

Housing 136 houses the electronic elements 122–132, and removably accepts video conferencing camera 100 when it is not attached to a computer. Video conferencing camera 100 is physically secured to camera converter 120 using fastening features 150. Camera converter 120 and video conferencing camera are electrically and communicatively coupled to each other through communication interfaces 104 and 130. Battery 144 supplies power to the electronic elements of camera converter 120 as well as to video conferencing camera 100, through communication interfaces 104 and 130.

The physical shape and dimensions of housing 136 as well as fastening features 150 are application, i.e. video conferencing camera, dependent. Communication interfaces 104 and 130 may be any one of a number of serial or parallel communication interfaces known in the art. Similarly, any one of a number of known battery types as well as sizes may be employed for battery 144.

On/off switch 138 in cooperation with general I/O interface 128 facilitates a user powering the combined unit on or off. Responsive to a change of position of on/off switch 138, microcontroller 122 applies or removes power supplied by battery 144 to/from the electronic elements of video conferencing camera 100 as well as the electronic elements of camera converter 120. Upon powering up the electronic elements of the combined unit, camera converter 120 initializes and directs video conferencing camera 100 through communication interfaces 104 and 130 as an attached computer would direct video conferencing camera 100. In response, video conferencing camera 100 starts outputting video signals for visual images "seen" by video capture 106. The video signals, however, are received by camera converter 120 instead, also through communication interfaces 104 and 130. The fact that the video signals are received by camera converter 120 is transparent to video conferencing camera 100.

Optical view finder 140 enables a user to see the same visual images "seen" by video capture 106 of video conferencing camera 100, and snap shot control button 142 in cooperation with general I/O interface 128 enables the user to control the actual taking of still images. Responsive to each "signaling" by the user, through snap shot control button 142, e.g. by depressing snap shot control button 142, microcontroller 122 generates a still image by taking a "snap shot" of the "current" visual image represented by the video signals.

Optical view finder 140 is optically coordinated with lens 102 of video conferencing camera 100 to enable a user to see the same visual images "seen" by video capture 106 of video conferencing camera 100. Snap shot control button 142 and general I/O interface 128 are intended to represent a broad range of these elements known in the art.

Memory 124 is used to provide temporary storage for the received video signals, and working storage for generating the still images. Removable non-volatile storage medium 126 is used to provide permanent storage for the generated still images (until deleted). Any one of a number of memory types may be employed for memory 124. In one embodiment, removable non-volatile storage medium 126 is a removable flash memory card. In another embodiment, it is a diskette. In yet another embodiment, the non-volatile storage medium is a fixed non-volatile storage medium instead, such as a disk drive.

The stored still images may be transferred to a display and/or processing device (not shown), such as a compatibly equipped computer, by removing removable non-volatile storage medium 126 and "coupling" it to the compatibly equipped computer through a compatible input/output mechanism. For example, in the case of a flash memory card, by placing the flash memory card in a flash memory card reader of the computer. For the illustrated embodiment, the stored still images may also be transferred to a display and/or processing device, by coupling the display and/or processing device to the combined unit through communication interface 132. Communication interface 132 may also be one of a number of known serial or parallel communication interfaces.

Visual display 146 and 148 are used to provide feedback to the user to facilitate operation of the combined unit as a digital camera. For the illustrated embodiment, visual display 146 is a LCD display for use to display a numeric count of the number of still images stored, and visual display 148 is a LCD display for use to display user messages for the user. Both types of displays are rendered by microcontroller 122.

Figure 3A:
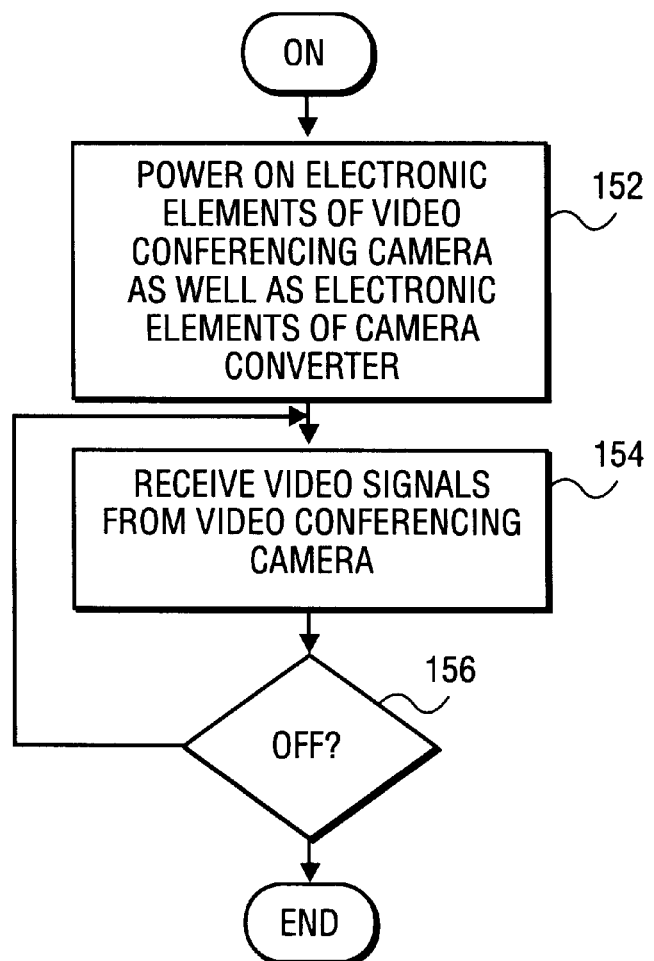
FIGS. 3a–3c illustrate the operational flow of one embodiment of the method steps of the present invention.
Figure 3B:
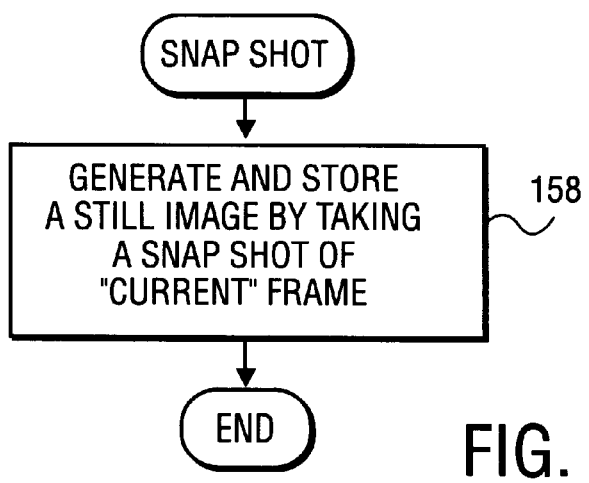
Figure 3C:
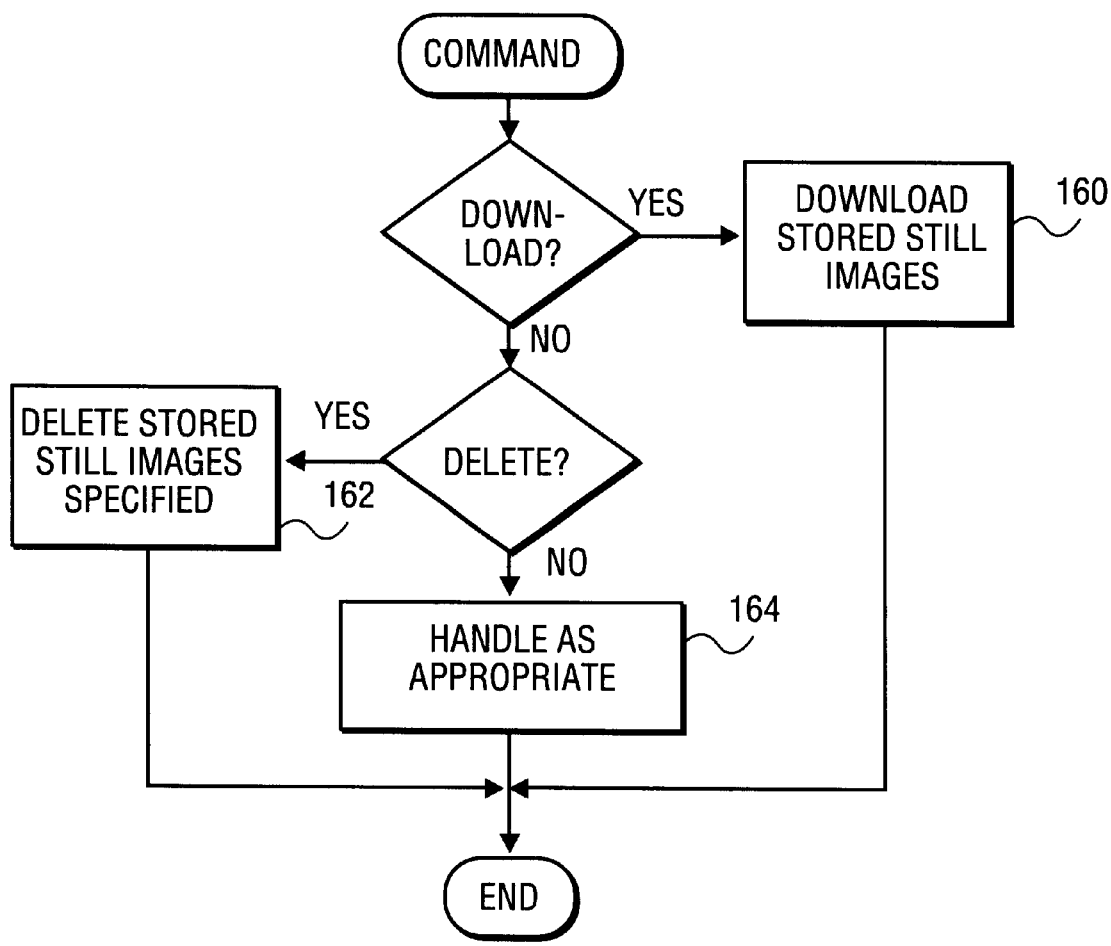

FIGS. 3a–3c are three flow charts illustrating one embodiment of the operational steps of the present invention. As illustrated in FIG. 3a and alluded to earlier, in response to a power on event, microcontroller 122 powers on the electronic elements of video conferencing camera 100 through communication interfaces 104 and 130, as well as the electronic elements of camera converter 102, step 152. Upon powering up, camera converter 102 starts receiving the video signals representing the visual images "seen" by video capture 106, step 154. Camera converter 102 continues to receive the video signals until the power-off event is detected, step 156, which for the illustrated embodiment, is denoted by an interrupt to microcontroller 122 triggered by general I/O interface 128 in response to the changing of the position of power on/off switch 138.

As illustrated in FIG. 3b, while receiving the video signals, in response to a snap shot event, camera converter 120 generates a still image of the current frame using the video signals, and stores the generated still image in non-volatile storage medium 126, step 158. For the illustrated embodiment, the snap shot event is denoted by an interrupt to microcontroller 122 triggered by general I/O interface 128 in response to the user "signaling" from snap shot control button 142. As illustrated in FIG. 3c, while connected to a computer and "idle", in response to a command from the attached computer, camera converter 120 downloads the stored still image to the attached computer, step 160, if the received command is a "download" command. Camera converter 120 deletes the stored still image, step 162, if the received command is a "delete" command. Otherwise, camera converter 120 handles the command in accordance with the semantics of the command, step 164.

Figure 4A:
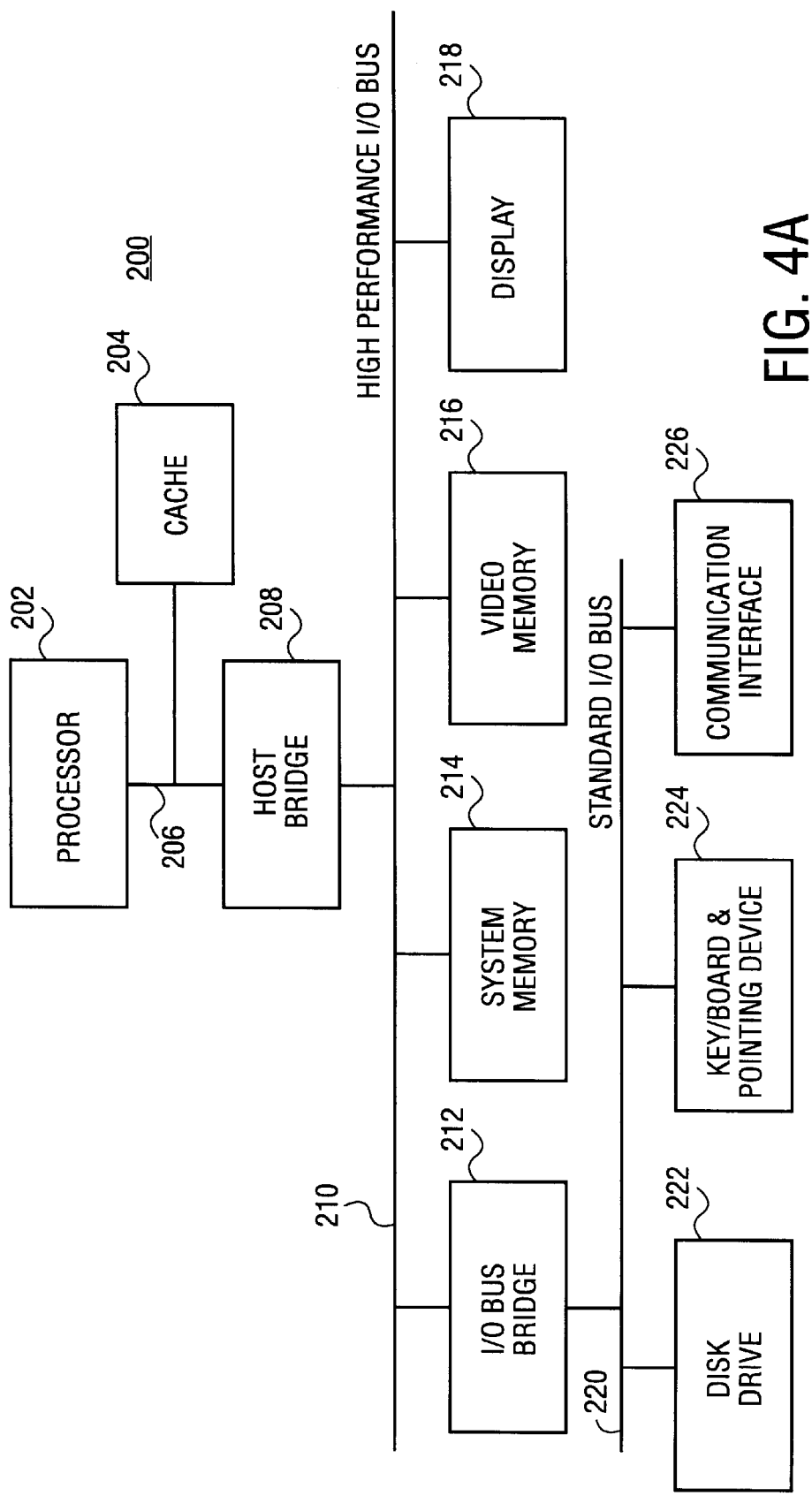
FIGS. 4a–4b illustrate a hardware and a software view of one embodiment of computer suitable for use to download the still images for display and/or processing.
Figure 4B:
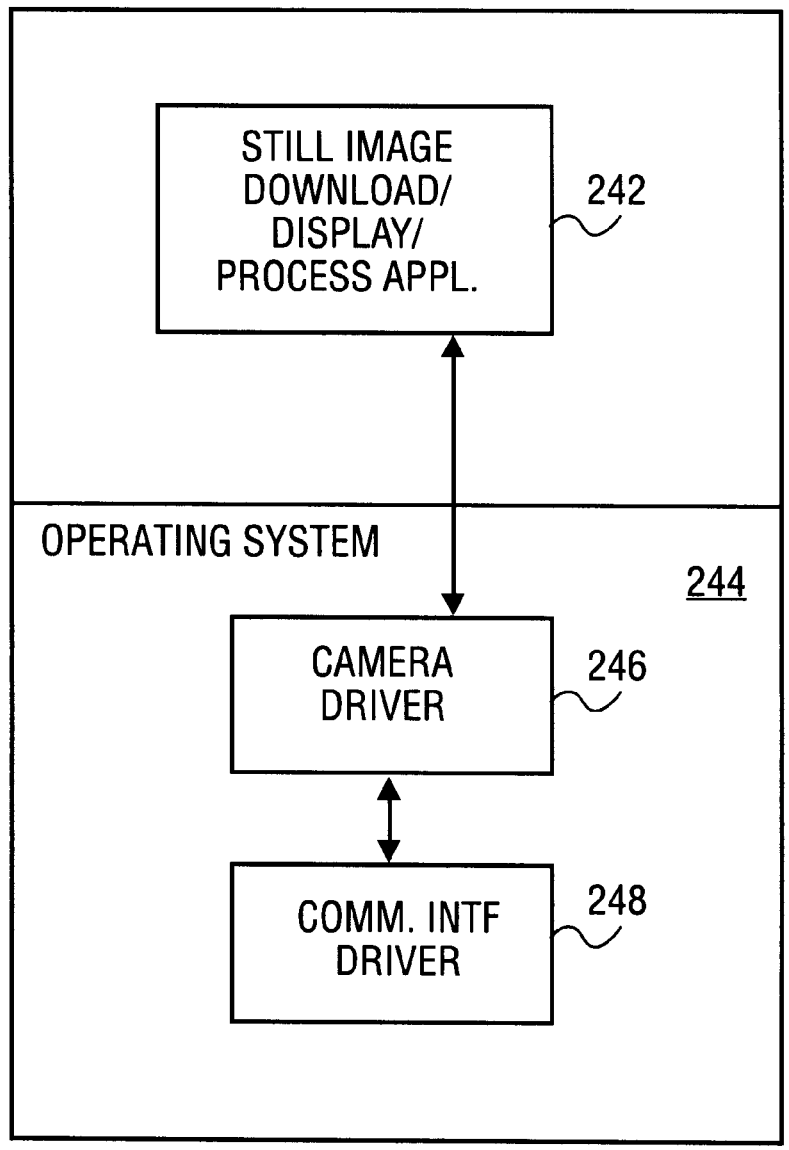

FIGS. 4a–4b illustrate a hardware view and a software view of one embodiment of a computer system suitable for use to download and display/process the generated still images. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 220 are bridged by I/O bus bridge 212. Coupled to processor bus 206 is cache 204. Coupled to high performance I/O bus 210 are system memory 214 and video memory 216. In turn, video display 218 is coupled to video memory 216. Coupled to standard I/O bus 220 are disk drive 222, keyboard and pointing device 224 and communication interface 226.

These elements perform their conventional functions known in the art. In particular, disk drive 222 and system memory 214 are used to store a permanent and a working copy of still image download/display/process application 242. The permanent copy may be pre-loaded into disk drive 222 in factory, loaded from distribution medium (not shown), or down loaded from a remote distribution source (not shown). Disk drive 222 and system memory 214 are also used to store a permanent and a working copy of operating system 244 including camera device driver 246 and communication interface driver 248. The constitutions of these elements are known. Any one of a number of implementations of these elements known in the art may be used to form computer system 200.

In general, those skilled in the art will recognize that the present invention is not limited by the details described; instead, the present invention can be practiced with modifications and alterations within the spirit and scope of the appended claims. The description is thus to be regarded as illustrative instead of restrictive on the present invention.

Thus, a method and apparatus for temporary converting a video conferencing camera into a digital camera has been disclosed.

What is claimed is:

1. An apparatus comprising:
   (a) a plurality of electronic components coupled to each other that operate to selectively generate digital still images responsive to user controls using video signals received from a removably attached video conferencing camera having a lens and a first communication interface; and
   (b) a housing that operates to enclose the electronic components, and to removably accept the video conferencing camera, the housing further having an optical view finder that is optically coordinated with said lens of the video conferencing camera, a second communication interface that mates with the first communication interface of the video conferencing camera, and user input mechanisms for providing said user controls.

2. The apparatus as set forth in claim 1, wherein the optical view finder of the apparatus is optically coordinated with the lens of the video conferencing camera to enable a user to see visual images that are visually equivalent to visual images seen by the video conferencing camera.

3. The apparatus as set forth in claim 1, wherein the apparatus further includes a storage medium for storing the generated digital still images.

4. The apparatus as set forth in claim 3, wherein the storage medium is a removable storage medium.

5. The apparatus as set forth in claim 3, wherein the storage medium is a fixed storage medium.

6. The apparatus as set forth in claim 3, wherein the apparatus further includes a third communication interface that operates to couple the apparatus to a computer to facilitate downloading of the stored still images to the computer.

7. The apparatus as set forth in claim 1, wherein the apparatus further includes one or more visual displays that operate to provide user feedback to a user.

8. The apparatus as set forth in claim 7, wherein the apparatus further includes a storage medium for storing the generated digital still images, and the one or more visual displays include a visual display that operates to display a cumulative count of the number of digital still images stored.

9. The apparatus as set forth in claim 1, wherein the apparatus further includes a battery receptacle that operates to receive one or more battery to supply power to the electronic components of the apparatus and the video conferencing camera.

10. A camera kit comprising:
   a) a video conferencing camera to be attached to a computer to facilitate conduct of a video conference by the computer for a user of the computer; and
   b) a converter that operates to removably receive the video conferencing camera when it is not attached to a computer and functionally convert the video conferencing camera into a digital camera that operates to generate digital still images, and having an optical view finder that is optically coordinated with a lens of the video conferencing camera.

11. The camera kit as set forth in claim 10, wherein the converter comprises:
   (b.1) a plurality of electronic components coupled to each other that operate to selectively generate the digital still images response to user controls using video signals received from the removably attached video conferencing camera which includes a first communication interface; and
   (b.2) a housing that operates to enclose the electronic components, and to removably accept the video conferencing camera, the housing further having a second communication interface that mates with the first communication interface of the video conferencing camera, and user input mechanisms for providing said user controls.

12. The camera kit as set forth in claim 10, wherein the converter further includes a storage medium for storing the generated digital still images.

13. The camera kit as set forth in claim 10, wherein the converter further includes one or more visual displays that operate to provide user feedback to a user.

14. The camera kit as set forth in claim 10, wherein the converter further includes a battery receptacle that operates to receive one or more battery to supply power to the electronic components of the apparatus and the video conferencing camera.

* * * * *